Nov. 11, 1958    M. RIGAUD    2,859,995
LOCKING DEVICE
Filed Feb. 23, 1955    2 Sheets-Sheet 1
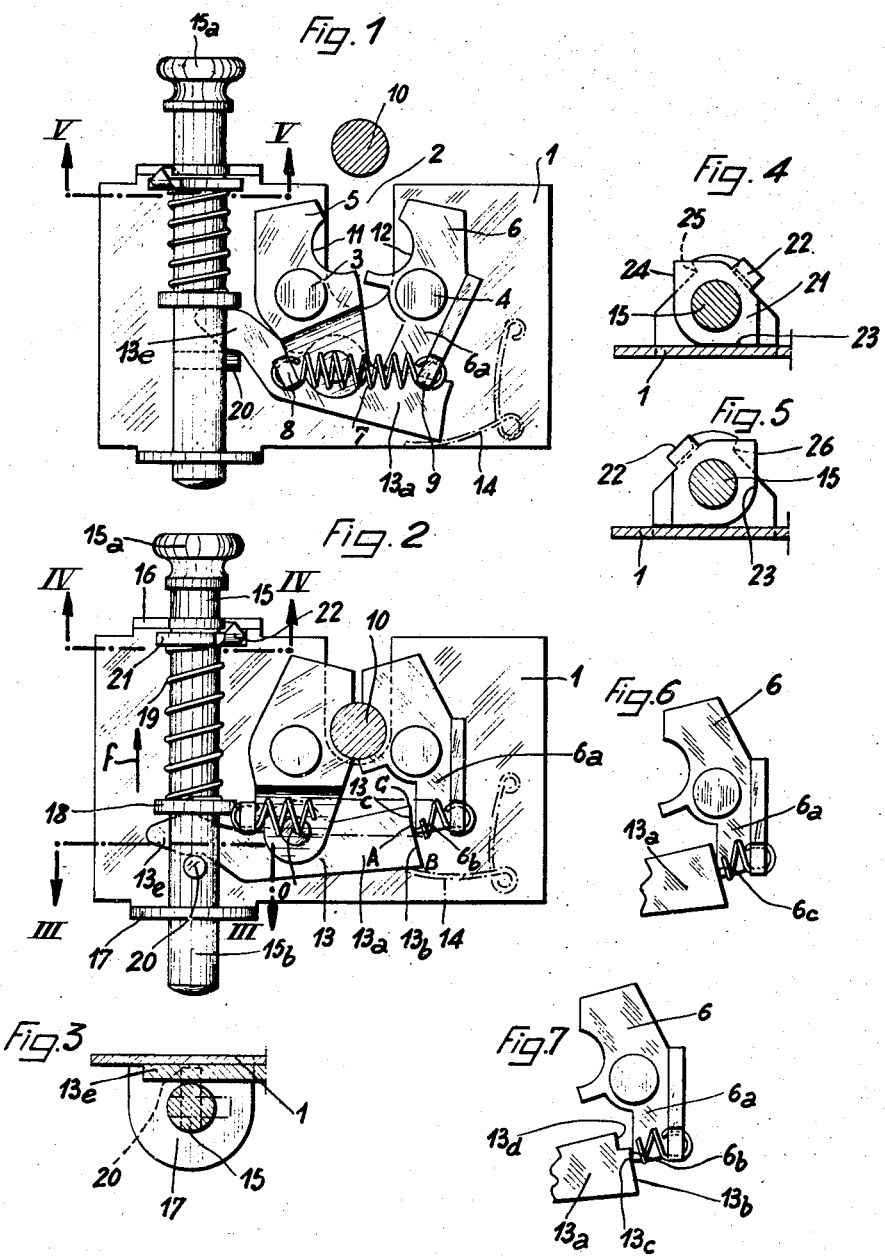

Nov. 11, 1958 M. RIGAUD 2,859,995
LOCKING DEVICE
Filed Feb. 23, 1955 2 Sheets-Sheet 2
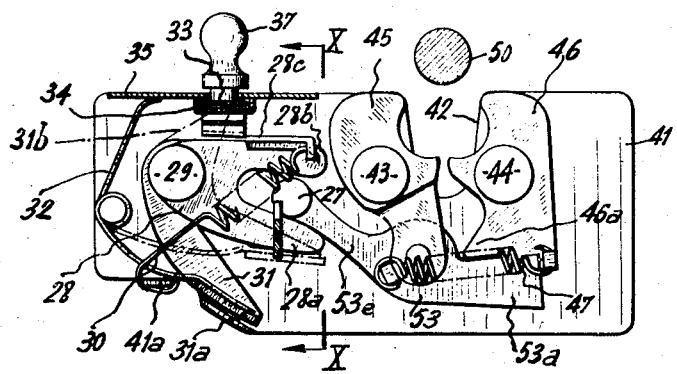
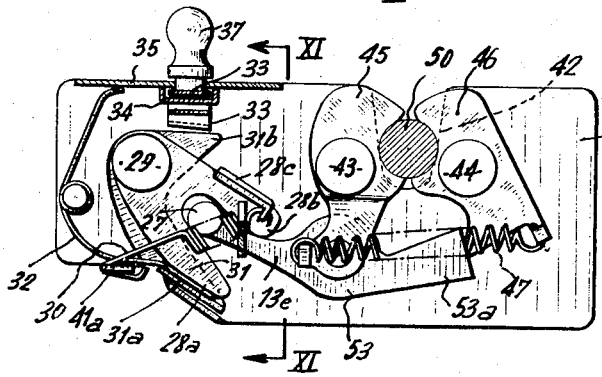
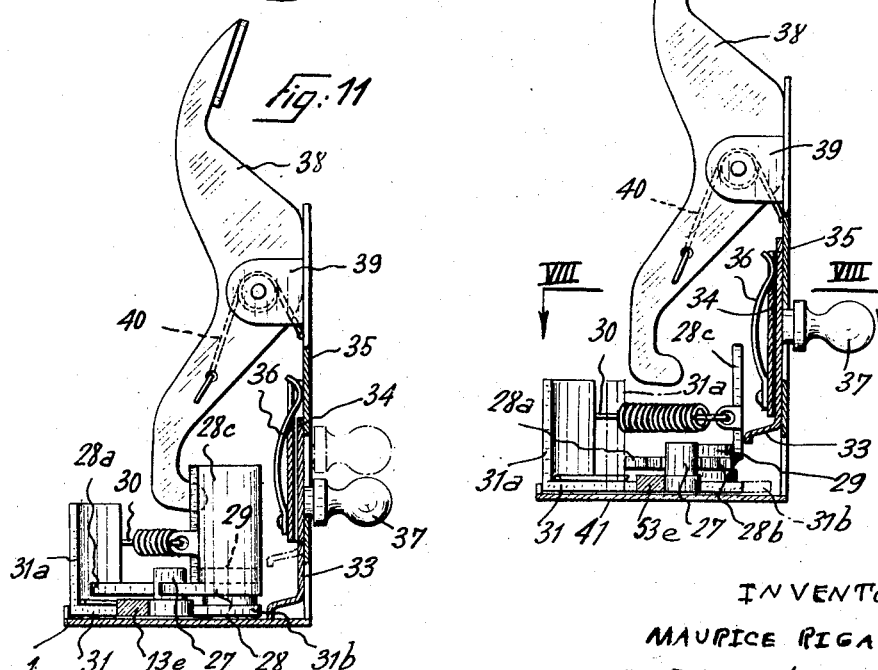
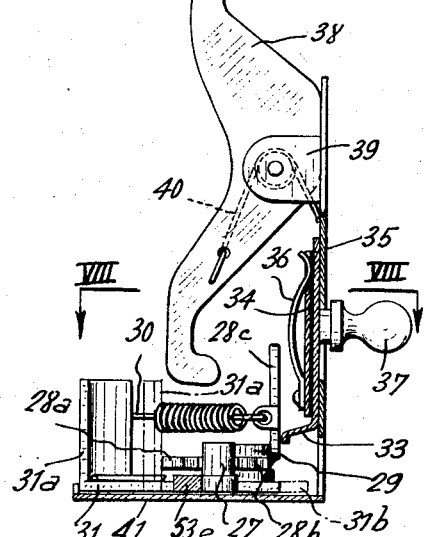
INVENTOR
MAURICE RIGAUD
By Robert Henderson
ATTORNEY United States Patent Office 2,859,995
Patented Nov. 11, 1958

2,859,995

LOCKING DEVICE

Maurice Rigaud, Paris, France, assignor to Societe des Agrafes Francaises & d'Articles Metalliques (Société Anonyme), Paris, France, a French company Application February 23, 1955, Serial No. 489,998

Claims priority, application France March 9, 1954

16 Claims. (Cl. 292—53)

The present invention relates to a locking device which is especially applicable to locks and in particular to the locks of doors, bonnets, luggage boots, etc., of vehicles, but which may also be used to attach a trailer to a tractor, a tipping truck or wagon to a chassis, etc., and, in a more general manner to the temporary attachment of any two objects whatever.

Locks are already known, and particularly for doors of vehicles, which comprise a locking device in which jaws which are normally open, are arranged so as to close upon a stud when they come into contact with the latter, a bolt being provided in order to hold the said jaws in the closed position. The withdrawal of the bolt causes the jaws to open.

The present invention has for its object a locking device of the kind referred to above, the design of which is especially simple and robust, and in which the jaws are held in the closed position by means of a lever which is pivoted on one of the jaws and is subjected to an elastic force so that it locks the other in position.

The locking lever and the jaw which is locked thereby are preferably engaged one on the other by means of an inclined ramp which ensures taking-up of the play likely to arise during use.

The elastic force to which the locking lever is subjected is preferably applied by means of a sliding member controlled by a spring and acting on an extension of the said lever, the sliding member comprising in addition a stop by means of which it acts on the said lever so as to bring it out of engagement with the jaw which it blocks, when it is displaced against the force of its spring.

In order to render the locking device inoperative, it will then suffice to displace the control member so as to remove the said stop, for example, by reversing the position of the member in question.

In accordance with an alternative form of embodiment, the mechanism which controls the release comprises a rotatable member, preferably having the shape of a fork, and which is adapted to act on the locking lever so as to free it from the jaw which it blocks.

In the particular case of the application to locks for the doors of vehicles, this rotatable member is subjected to the action of two separate control members. One of these, which is intended to be operated from outside the vehicle, is adapted to be rendered inoperative at will; the other, which is actuated from inside the vehicle, may be arranged to act at a distance.

The description which follows below with respect to the attached drawings (which are given by way of example only, and not in any sense by way of limitation) will make it quite clear how the invention may be carried into effect, the special features which may be brought out either in the text or in the drawings being understood to form a part of the said invention.

Figure 1 is a diagrammatic view in plan of a lock comprising the bolting or locking device which forms the object of the present invention, the device being shown in the open position.

Figure 2 is a view similar to that preceding, and showing the lock in the closed position.

Figure 3 is a cross-section taken along the line III—III of Figure 2.

Figure 4 is a cross-section following the line IV—IV of Figure 2.

Figure 5 is a cross-section following the line V—V of Figure 1.

Figures 6 and 7 are partial views showing alternative forms of details.

Figure 8 is a plan view, with a partial cross-section following the line VIII—VIII of Figure 10, of a lock constructed in accordance with an alternative form, the jaws being open.

Figure 9 is a view similar to that preceding, the jaws being closed.

Figure 10 is a cross-section taken along the line X—X of Figure 8.

Figure 11 is a cross-section following the line XI—XI of Figure 9.

In the form of embodiment shown in the drawings, the bolting device is applied to a lock which comprises a lock-plate 1 provided with a notch 2 on each side of which jaws 5 and 6 are pivotally mounted on pivots 3 and 4 substantially at their central points. A spring 7 is stretched between two pins 8 and 9 which are respectively provided at the rear ends of the jaws 5 and 6 so as to hold the said jaws normally separated. The jaws co-operate with a catch stud 10, of cylindrical shape in the present case; to this end, they are provided with indentations 11 and 12 of appropriate shape.

At the rear end of the jaw 5 is pivoted a lever 13, the arm 13a of which is given such dimensions that it can be inserted by its end in front of the rear arm 6a of the jaw 6 when the jaws are re-closed. A spring 14 may be provided to restore the lever 13 to the position of closure with the arm 6a.

A number of various shapes may be given to the arms 13a and 6a.

In Figures 1 and 2, the arm 6a comprises an edge 6b having a sharp angle or a small hollow curvature, by means of which it is supported on the extreme edge of the arm 13a; this latter edge comprises two sloping surfaces 13b and 13c, each of which makes a slightly obtuse angle with the straight line joining their point of intersection A to the pivotal centre O of the lever 13 on the jaw 5.

The edge 6b may be provided on the lever 13 and the sloping faces on the arm 6a of the jaw.

In Figure 6, the arm 6a has a supporting face 6c by means of which it tends to be applied flat upon the edge of the arm 13a.

Finally, in Figure 7, the extreme edge of the arm 13a, similar to that which has been shown in Figures 1 and 2, comprises in addition one or a number of rebates 13d against which the arm 6a can be applied.

The lever 13 is subjected to the action of a push-rod 15 terminating in a button 15a and mounted in lugs 16 and 17 forming part of the lock-plate. This push-rod carries on the one hand a collet 18 by means of which it comes up against the arm 13e of the lever 13 under the action of a spring 19, and on the other hand, a pin 20 by means of which it can act on the other side of the arm 13e when it is displaced against the force of the spring 19.

With the push-rod 15 is associated a cam 21 which is itself rigidly fixed for rotation therewith and which has a tooth 22 and two faces 23 and 24 which come into contact with the lock-plate. Two notches 25 and 26, in which the tooth 22 is adapted to engage, are formed in the lug 16 in order to retain the cam 21 in one or the other of the positions shown in Figures 4 and 5, The operation of the lock above-described is as follows:

When the lock is open (Figure 1), the two jaws 5 and 6 are separated and the lever 13 is held under the action of the spring 19 and by its arm 13a, on the end face of the rear part 6a of the jaw 6. It is to be noted that if the said end face is correctly shaped, the reaction of the arm 13a is sufficient to hold the jaws apart.

When the door is pushed, the stud 10 passes between the jaws 5 and 6 and pushes back the indentations 11 and 12 in these jaws. The jaws then come together and rigidly grip the stud 10, whilst their rear parts separate, which enables the lever 13, which is pushed by the collet 18 acting on its arm 13e (and eventually, for example, in the case of locks on heavy vehicles, by the spring 14) to be inserted by its arm 13a in front of the rear part 6a of the jaw 6.

In the form of embodiment of Figures 1 and 2, the edge 6b comes into contact with the inclined ramp 13b of the arm 13a and it will be observed that the said edge is then more or less distant from the point A, depending on whether the various parts have a greater or less degree of play. There is thus provided an automatic compensation for the play which arises due to wear. In addition, if the force applied by the collet 18 (and eventually the spring 14) on the lever 13 were removed, by reason of the existence of the ramp 13c, the end 6b would tend to remain at A under the effect of the spring 7; for this reason, no accidental sliding movement of the lever 13, and thus no accidental opening of the lock, is to be feared.

In the alternative form shown in Figure 6, the same results are obtained by means of the arrangement of the surface 6c. In the modification illustrated in Figure 7, in addition to the results already referred to in connection with Figures 1 and 2, two closure positions are obtained by contact of the extremity 6b either against the rebate 13d or on the ramps 13b, 13c, this feature giving additional safety.

The lock is usually mounted either on the door or other opening member or on the door frame, so that the button 15a is located on the inside. In order to open the lock, it is only necessary to move the push-rod 15 in the direction of the arrow f (see Figure 2), and thus to pull the button 15a from the inside, the opening of the lock from the outside being preferably effected by means of a lever handle or similar member, not shown, acting on the end 15b of the push-rod, for example a button which does not permit of turning the push-rod 15. When the push-rod 15 is moved, the stud 20 acts on the arm 13e of the lever 13; the latter pivots and frees the extremity 6a of the jaw 6. The jaws open out, thus forcing back the stud 10 and the door opens.

In order to bolt the lock, it is merely necessary to turn the push-rod 15 by a quarter of a turn so as to bring it from the position shown in Figures 2 and 4 to that shown in Figures 1 and 5. In these conditions, the pin 20 is oriented laterally and cannot then come in contact with the arm 13e of the lever 13 when the push-rod is moved. This bolting action may be carried out whether the lock is open or closed, since the bolting does not interfere in any way with the closing. Removal of the bolting of the lock is carried out by the reverse process of that which has just been described.

The lock is of course mounted in such a way that it is impossible to have access to the outer extremity 15a of the push-rod 15 so as to be able to bolt or remove the locking action of this latter.

In the form of embodiment shown in Figures 8 to 11, the lock comprises a bolting device similar to that which has been previously described. There will be recognised in the drawing a lock-plate 41 provided with a slot 42, the edges of which are in this case slightly flared so as to form a locating wedge for the door with the stud 50; the jaws 45 and 46 are also pivoted on their axes 43 and 44 and are brought into the open position (see Figure 8) by a spring 47. The jaw 45 carries a locking lever 53, the arm 53a of which is arranged so as to be inserted in front of the rear arm 46a of the jaw 46 when the jaws are re-closed on the stud 50 (see Figure 9).

In the present form of embodiment, the arm 53e of the lever 53 is provided with a cylindrical finger 27. A fork-shaped member 28 is pivotally mounted on the lock-plate 41 by means of a spindle 29 and comprises two arms 28a and 28b located on each side of the finger 27. The arm 28b is provided with an extension 28c to which is fixed a spring 30, the other end of which is attached to a lug 41a on the lock-plate 41. This spring acts on the fork 28 in the direction in which the lever 53 is moved into the locking position. It is to be noted from Figure 9 that the spring 30 is only slightly in tension when the lever occupies this position. Furthermore, as has already been previously emphasized, the members 45, 46 and 53 are subjected to forces which tend to keep them blocked in position independently of the action of the spring 30.

In the present example, in which the locking device is described in its application to a lock for a vehicle door, two means are provided independently of each other for causing the fork 28 to pivot so as to cause the jaws 45 and 46 to open.

One of these means, which permits of operation from the outside of the vehicle, comprises a cranked lever 31, pivotally mounted on the pin or spindle 29 between the lock-plate and the forked member 28. This lever comprises a limb 31a accessible from the outside of the lock and which may be actuated, for example by means of the door handle. The limb 31a is arranged in such a manner that it comes up against the arm 28a of the fork 28 which it causes to turn so as to free the lever 53 and thus to open the lock. A spring 32 urges the lever 31 towards the outside. The lever 31 may be made inoperative by the interposition in front of its inside arm 31b of a stop member 33 which is housed in a guide 34 carried on a right-angle extension 35 of the lock-plate. A spring 36 carried by the guide 34 (see Figures 10 and 11) retains the stop in the position to which it has been brought by means of the knob 37 located on the inside of the door.

Operation of the device from the interior of the vehicle is effected by means of the lever 38 (see Figures 10 and 11) mounted in a cheek 39 carried by the extension 35 and controlled by a spring 40. This lever acts on the limb 28c of the fork 28. If the operation from the inside is to be effected from a distance, the lever 38 may for example be replaced by a bell-crank lever, not shown, also mounted on the extension 35.

It will of course be understood that modifications may be made to the locking device which has just been described, in particular by the substitution of equivalent technical means, without thereby departing from the spirit or from the scope of the present invention.

In the particular case of certain applications, for example, a remote or distant control, not shown, may be provided.

What I claim is:

1. A locking device for use in cooperation with a stud with which it is adapted to come into locking engagement, said device comprising, in combination, a supporting base member; a pair of oppositely disposed jaw elements pivotally mounted on said base member, and having opposed locking arms adapted to move toward each other to lock such a stud therebetween, and opposed non-locking arms arranged to move apart as said locking arms move toward each other: spring means operatively connected with said jaw elements for urging the non-locking arms thereof together and the locking arms apart, and thus to stud-freeing position; a lever pivotally mounted on the non-locking arm of one of said jaw elements and adapted to extend in a direction generally transversely to the direction of extent of said jaw elements; said lever having a blocking portion thereon which is movable to a blocking position in which said blocking portion extends between said non-locking arms and into wedging engagement directly with an inner side portion of the non-locking arm of the other of said jaw elements thus urging the non-locking arms apart and the locking arms into firm engagement with the stud; and means resiliently urging said lever toward its wedging position.

2. A locking device for use in cooperation with a stud with which it is adapted to come into locking engagement, said device comprising, in combination, a supporting base member; a pair of oppositely disposed jaw elements pivotally mounted on said base member, and having opposed locking arms adapted to move toward each other to lock such a stud therebetween, and opposed non-locking arms arranged to move apart as said locking arms move toward each other; means associated with at least one of said jaw elements for normally urging the locking arm thereof away from the locking arm of the other jaw element, and thus to stud-freeing position; a lever pivotally mounted on the non-locking arm of one of said jaw elements and having a blocking portion, said lever being pivotally movable to a blocking position in which said blocking portion extends between said non-locking arms and into abutting engagement directly with a portion of the non-locking arm of the other of the jaw elements thus preventing the non-locking arms of the respective jaw elements from swinging toward each other and maintaining the locking arms in engagement with the stud, and means resiliently urging said lever toward its said blocking position.

3. The locking device as set forth in claim 2 wherein said lever and said other jaw element are engaged one upon the other by means of cooperating relatively inclined contacting surfaces when in blocking position, whereby a compensation for play due to wear is provided.

4. The locking device as set forth in claim 3 wherein a counter inclined surface is provided in addition to said first named inclined surface, whereby any accidental sliding movement of said lever with respect to said other jaw element is prevented.

5. The locking device as set forth in claim 2, wherein the edge of said other jaw element against which said lever is urged when said jaw elements are not gripped around the stud is shaped in such a manner that the urging pressure tends to hold said jaw elements open.

6. The locking device as set forth in claim 2 in which an inclined surface is formed on the extreme end of the blocking lever, said lever being of a length such that its end surface will swing between the non-locking portions of the levers and will be inclined with respect to and will wedgingly engage the inner side portion of the end of the second named jaw element, whereby the range of possible points of effective contact between said lever and said arm is increased and compensation for wear attained.

7. The locking device as set forth in claim 6 in which a second inclined surface is formed on said end of the blocking lever, said second inclined surface diverging from the inward end of said first named inclined surface and providing with said first named surface a shallow notch within which the abutting surface of said non-locking arm of the jaw element will tend to seat and remain under the influence of the means which urge the non-locking jaw arms together.

8. The locking device as set forth in claim 2 in which the blocking lever is of such a length that in blocking position its end surface may swing into blocking relation between the non-locking arms of said jaw elements, and when in released position a side surface of said blocking lever is pressed by said resilient urging means into frictional contact with the end of said second named non-locking arm, thus aiding in holding said arms in stud disengaging position.

9. A locking device designed for use in co-operation with a stud, comprising in combination a plate, a pair of double armed jaws pivotally mounted on said plate and adapted to be brought into gripping engagement with said stud by one of their arms; a lever pivotally mounted on the non-gripping arm of one of said jaws; means supported by said plate for resiliently urging said lever towards the non-gripping arm of the other of said jaws, the length of said lever being such that said lever is brought into stopping engagement with said nongripping arm of said other jaw when said jaws are gripped round said stud; a member slidably mounted on said plate, and a stop carried by said member and adapted to act on said lever in a direction opposite to that of said urging means upon actuation of said sliding member.

10. The combination of claim 9 wherein said sliding member is adapted to be brought into a position in which said stop remains inoperative.

11. A locking device designed for use in co-operation with a stud, comprising in combination a plate, a pair of double armed jaws pivotally mounted on said plate and adapted to be brought into gripping engagement with said stud by one of their arms; a lever pivotally mounted on the non-gripping arm of one of said jaws, a member slidably mounted on said plate, a collar on said member adapted to be brought into engagement with said lever for urging said lever towards the non-gripping arm of the other of said jaws, a spring mounted on said member between said collar and said plate for resiliently assuming said urging action, and a finger carried by said member and adapted to act on said lever upon actuation of said sliding member against said spring, said sliding member being further mounted in said plate for rotation about its longitudinal axis, whereby said finger may be brought out of engagement with said lever.

12. A locking device designed for use in co-operation with a stud, comprising in combination a plate, a pair of double armed jaws pivotally mounted on said plate and adapted to be brought into gripping engagement with said stud by one of their arms; a lever pivotally mounted on the non-gripping arm of one of said jaws, means supported by said plate for resiliently urging said lever towards the non-gripping arm of the other of said jaws, the length of said lever being such that said lever is brought into stopping engagement with said non-gripping arm of said other jaw when said jaws are gripped round said stud; and a member rotatably mounted on said plate and adapted to act on said lever in a direction opposite to that of said urging means.

13. The combination of claim 12 wherein said rotatable member has the shape of a two-armed fork and said lever carries a finger disposed between the arms of said fork.

14. The combination of claim 12 wherein two independent members adapted to act on said rotatable member, are mounted on said plate.

15. The combination of claim 14 wherein a stop, provided on said plate is adapted to be interposed on the path of one of said independent members.

16. A locking device designed for use in co-operation with a stud, comprising in combination a plate, a pair of double armed jaws pivotally mounted on said plate and adapted to be brought into gripping engagement with said stud by one of their arms; a lever pivotally mounted on the non-gripping arm of one of said jaws, the length of said lever being such that said lever is brought into stopping engagement with said non-gripping arm of said other jaw when said jaws are gripped round said stud; a member rotatably mounted on an axis carried by said plate, said member having the shape of a two-armed fork, a finger carried by said lever and disposed between the arms of said fork; spring means attached to said plate and to said rotatable member, for urging said lever towards the non-gripping arm of the other of said jaws; a cranked lever mounted on the same axis as said rotatable member, said cranked lever being provided with a projection adapted to act on said rotatable member in a direction opposite to that of said spring means, a stop movably mounted on said plate and adapted to be interposed on the path of said cranked lever and a further actuating member mounted on said plate and adapted to act on said rotatable member in a direction opposite to that of said spring means.

References Cited in the file of this patent

UNITED STATES PATENTS

| | | |
|---|---|---|
| 689,074 | Ferris | Dec. 17, 1901 |
| 1,334,852 | Gorowitz | Mar. 23, 1920 |
| 2,646,299 | Kramer | July 21, 1953 |

FOREIGN PATENTS

| | | |
|---|---|---|
| 42,177 | France | Mar. 7, 1933 |